United States Patent [19]

Huang et al.

[11] Patent Number: 5,139,709
[45] Date of Patent: Aug. 18, 1992

[54] PROCESS FOR CONVERTING URANYL COMPOUNDS TO UO₂ VIA ADU

[75] Inventors: Ching T. Huang, Lung-Tan; Maw S. Kuo, Taipei; Jiing G. Tyen, Pan-Chiao; Mu C. Shieh, Lung-Tan, all of Taiwan

[73] Assignee: Institute of Nuclear Energy Research, Chinese Atomic Energy Council, Taiwan, Taiwan

[21] Appl. No.: 645,252

[22] Filed: Jan. 24, 1991

[51] Int. Cl.⁵ ............................................. G21C 21/00
[52] U.S. Cl. .................................... 264/0.5; 423/261; 252/638; 252/643
[58] Field of Search ............... 423/253, 258, 261, 260; 264/0.5; 252/643, 638

[56] References Cited

U.S. PATENT DOCUMENTS

| | | | |
|---|---|---|---|
| 3,579,311 | 5/1971 | McCoy | 423/261 |
| 3,758,664 | 9/1973 | Gerrald | 423/15 |
| 3,998,925 | 12/1976 | Fuller | 423/15 |
| 4,119,563 | 10/1978 | Kadner et al. | 252/628 |
| 4,234,550 | 11/1980 | DeHollander | 423/261 |
| 4,255,393 | 3/1981 | Chiang | 423/15 |
| 4,401,628 | 8/1983 | Chiang et al. | 423/15 |
| 4,430,276 | 2/1984 | Radford et al. | 264/0.5 |
| 4,656,015 | 4/1987 | Divins et al. | 423/261 |
| 4,808,390 | 2/1989 | Tanaka et al. | 423/261 |
| 4,839,149 | 6/1989 | Madic et al. | 423/251 |
| 4,873,031 | 10/1989 | Yato et al. | 264/0.5 |
| 4,882,100 | 11/1989 | Yato et al. | 264/0.5 |
| 4,963,294 | 10/1990 | Yato et al. | 252/636 |

*Primary Examiner*—Brooks H. Hunt
*Assistant Examiner*—Ngoclan T. Mai
*Attorney, Agent, or Firm*—Wenderoth, Lind & Ponack

[57] ABSTRACT

ADU (ammonium diuranate) is prepared in particle form directly by reacting ammonium gas with liquid droplets of atomized uranyl compound solutions. Generation of liquid filtrate is prevented by using concentrated solutions of uranyl compounds as feed solutions, or drying the wet ADU particles formed before their settlement when a feed of low concentration is used. The ADU particle thus prepared is finely divided and easy-handling. No filtration operation is necessary in the preparation. The UO₂ powder consequently obtained after calcining and reduction has consistent quality from batch to batch and has good pelletizing and sintering properties. Uranium dioxide with low fluorine content can be prepared from uranyl fluoride solution. Gadolinium-uranium oxide can also be prepared with the present method using an aqueous mixture of gadolinium nitrate and uranyl nitrate as a feed solution.

25 Claims, No Drawings

PROCESS FOR CONVERTING URANYL COMPOUNDS TO UO₂ VIA ADU

BACKGROUND OF THE INVENTION

Uranium dioxide for the manufacturing of current light water reactor fuel is currently produced from the conversion of $UF_6$, mainly based either on a dry- or a wet-conversion process. Several routes of the dry-conversion process have been revealed so far, and chemical procedures involved in those routes are similar. $UF_6$ is usually pyrohydrolyzed with steam to form $UO_2F_2$ powder which is reduced to $UO_2$ directly by a hydrogen-steam mixture, or is calcined in air to $U_3O_8$ first and then reduced to $UO_2$ with a hydrogen-steam gas. In the wet-conversion process, vaporized $UF_6$ is hydrolyzed with water to form an aqueous $UO_2F_2$-HF solution, from which ammonium diuranate (ADU) or ammonium uranyl carbonate (AUC) is precipitated with ammonia water or ammonium carbonate, respectively. After filtration, ADU or AUC is calcined to $UO_3$, which is then reduced to $UO_2$ with a hydrogen-steam gas. According to the chemical compositions of the precipitates, it is called an ADU process or an AUC process.

It is recognized that the $UO_2$ powder produced from the wet-ADU process possesses excellent powder characteristics required for pelletizing and sintering, and gives good microstructure to the sintered pellet. Although the ADU process is widely used currently, it is plagued by some inherent drawbacks. For example, in the conventional ADU process, such as that disclosed in the U.S. Pat. Nos. 3,394,997 and 3,998,925, $UF_6$ is hydrolyzed with water to form an aqueous solution containing 100 to 200 g/l of uranium and 0.4 to 0.8 mol/l of hydrogen fluoride. As ADU is precipitated from this solution, a pasty slurry is obtained and several tens of liters of the fluoride-containing liquid filtrate is thus generated for the production of 1 kg $UO_2$. This introduces a serious problem of liquid waste disposal to the conventional ADU process. Moreover, because ADU is a kind of slimy cake, the process also involves a complicated filtration operation.

After a series of studies on the formation of ADU, it was found that ADU is formed simultaneously as soon as fine droplets of a concentrated solution of an uranyl compound are introduced into an ammonia gas stream, and the fluorine content of the $UO_2$ powder consequently produced using uranyl fluoride solution as a feed can be lower than 50 ppm. Therefore, instead of being precipitated from a dilute solution of uranyl compounds with ammonia water, ADU is prepared in particle form directly by introducing atomized droplets of a concentrated solution of uranyl compound into an ammonia gas stream in the novel process disclosed herein. The generation of the fluoride-containing liquid filtrate in converting uranyl fluoride to $UO_2$ is thus avoided, and filtration operation is no longer necessary. The process is thus greatly simplified.

SUMMARY OF THE INVENTION

It is the object of the present invention to provide a process generating no liquid filtrate and involving no tedious filtration operation for converting $UF_6$ or uranyl compounds to $UO_2$ via ADU. Due to the simple process variables involved in this new process, the $UO_2$ powder produced inherently possesses much higher consistency in quality than those produced with the conventional wet-ADU process.

To achieve its object, this invention provides a process for converting $UF_6$ to $UO_2$ powder comprising the steps of (a) pyrohydrolyzing $UF_6$ with steam to obtain $UO_2F_2$ powder;

(b) dissolving the said $UO_2F_2$ powder in water to form an aqueous uranyl solution;

(c) atomizing the said aqueous solution into a gas stream of ammonia gas or ammonium hydroxide to prepare wet ADU particles;

(d) drying and calcining the said ADU particles directly to $UO_3$ or $U_3O_8$, or their mixture;

(e) reducing the said calcined particles to $UO_2$ with hydrogen or hydrogen-steam gas.

Accordingly, the present invention also provides a process for converting other uranyl compounds which form ADU with ammonium hydroxide, such as uranyl nitrate, uranyl sulfate, uranyl chloride, and etc., to $UO_2$, comprising dissolving the uranyl compound in water as the first step and the foregoing steps of (c) to (e), whether or not additional metal species is incorporated into the aqueous solution of uranyl compound.

Instead of precipitating ADU from diluted uranyl solution with ammonia water in the conventional wet-ADU process, in the present invention, ADU is made by reacting gaseous ammonia or ammonium hydroxide vapor with a rather concentrated solution of uranyl compound. Basically, uranyl solution of any concentration can be used to prepare the ADU powder directly with the present invention, but only from those with high uranium concentration can the ADU be obtained as a divided wet particle rather than a slimy slurry. Nevertheless, dry ADU particles can be obtained directly in all cases by heating the wet ADU particle before settling, just as is usually done in spray drying. The particle thus obtained is of easy-easy-handling and free flowing. No filtration operation is involved and no liquid filtrate is generated in the present invention. The only liquid effluent coming out of the ADU preparation is a limited amount of water condensate recovered in the drying of ADU which it is free from uranium and is re-usable in the dissolution of $UO_2F_2$ powder.

DESCRIPTION OF THE INVENTION

In conducting this invention, $UF_6$ in a cylinder is vaporized by heating in a water bath. The vapor is then introduced to a tube reactor, where it is pyrohydrolyzed with steam to carry out the reaction:

$$UF_6 + 2H_2O = UO_2F_2(HF)_n + (4-n)HF \qquad (1)$$

With a careful control of the flow rates of $UF_6$ and steam, finely divided $UO_2F_2$ powders are obtained and collected at the bottom of the reactor. HF gas produced in reaction (1) may be neutralized in an alkali scrubber or recovered as a by-product after passing through a sintered-metal filter assembly.

The $UO_2F_2$ powder obtained is dissolved in de-ionized water to prepared $UO_2F_2$ solution. The solution is then atomized to form very small liquid droplets with an atomizer, such as: an impingement type nozzle, or a single-fluid nozzle, or a double-fluid nozzle, or an ultra sonic atomizer, on the top of a spray column. To the bottom of the column, ammonia gas is introduced to react with the liquid droplets of $UO_2F_2$ as follows:

$$NH_3 + H_2O = NH_4OH \quad (2)$$

$$UO_2F_2(HF)_n + (x + n + 2) NH_4OH = \quad (3)$$

$$UO_3(NH_3)_x(H_2O)_{2-x} + (2 + n) NH_4F + (2x - 1) H_2O$$
$$(ADU)$$

As shown, ammonia gas is absorbed by water in the droplets to form $NH_4OH$, which then reacts with $UO_2F_2$ to form ADU following reaction (3).

It is generally recognized that there are four types of ADU, i.e., type I, II, III, and IV, with the value of x expressed in reaction (3) equal to 0, $\frac{1}{3}$, $\frac{1}{2}$, and $\frac{2}{3}$, respectively. Except type I, all other types of ADU may be included in the product of the present invention with their molar ratios depending on the operating conditions, such as $UO_2F_2$ concentration in feed solution; the pressure of ammonia gas; the drop size of the aqueous solution of $UO_2F_2$; and the resident time. Generally, a high pressure of ammonia gas is good for the formation of the high type ADU. However, too high a pressure may cause some operational troubles. A small droplet size of the uranyl compound solution will increase the rate of the formation of ADU, and will be good for the formation of the high type ADU too. However, a droplet too small in size may cause some problems in separating ADU from gas stream. Additional heat may be applied to increase the reaction temperature to facilitate the formation of ADU, and to accomplish a quick removal of the moisture from the ADU product. Ammonium uranyl fluoride (AUF) is a precursory product in the reaction, and it may exist in the ADU product, when a feed solution having a very high concentration of uranium is used, or when the ammoniation is not sufficiently done. Nevertheless, the presence of AUF in the ADU mixture will not give any trouble in converting all the uranium species to $UO_2$, since AUF, as well as ADU, is also decomposed to form uranium oxide on calcining.

The formation reaction of ADU is exothermic, therefore, part of the water in the liquid $UO_2F_2$ droplets is vaporized during the formation of ADU. Meanwhile, some of the water becomes a constituent part of ADU. Therefore, a feed solution of $UO_2F_2$ having an uranium concentration higher than 500 g/l, or preferably higher than 600 g/l, will give wet finely divided ADU particles in the reaction without applying additional heat. When a less concentrated feed solution is used, the ADU product obtained is no longer divided particles, but is paste-like. Nevertheless, the stream of the wet ADU particles can be heated before settling, so as to remove the moisture to obtain a free flowing dry powder, directly, just as the way usually done in a spray drying. It is preferrable, for simplifing the operation, to carry out the drying and the calcining steps together in a drying-and-calcining step at 300° to 750° C., or preferably at 400° to 600° C. Ammonium fluoride vaporized in the step is separated from water vapor by condensing it at a temperature ca. 105° C. The ammonium fluoride thus recovered is free from uranium, and is readily a valuable resource of fluorine. The water vapor is condensed and recycled for the dissolution of $UO_2F_2$ powder. Clearly, no liquid filtrate is generated, and no complicated filtration operation is involved in the preparation of ADU, if the method of the present invention is used.

Produced under an atmosphere of nitrogen gas, the calcined product is essentially $UO_3$, which is then reduced to $UO_2$ in a reduction furnace with a hydrogen-steam mixture at 500° to 850° C., or preferably at 550° to 650° C. In the reduction furnace, the residual fluoro species interact with steam to form HF and then leave the product. The $UO_2$ thus obtained is a finely divided powder having low fluorine content, high activity, and good sinterability.

Besides uranyl fluoride, other uranyl compounds such as uranyl nitrate, uranyl chloride, uranyl sulfate, and etc., can also be used to prepare ADU with the present method. Furthermore, the present invention is also applicable to the preparation of mixed metal oxides containing uranium, for instance, the mixed oxide of uranium and gadolinium can be made, if a solution containing uranyl nitrate and gadolinium nitrate is used as the feed solution.

The following examples illustrate the present invention. It is understood that they are only exemplary and do not limit the scope of the present invention.

EXAMPLE 1

$UF_6$ in an 8A cylinder was loaded in an electrically heated water bath equiped with a stirrer. The temperature of water in the bath was automatically controlled at 90° to 95° C. and was kept homogeneous by stirring. The $UF_6$ in the cylinder was melted and vaporized to give a final pressure of ca. 30 psig. Then, the vapor was introduced into the top part of an Inconel tube reactor of 4" diameter through a mass flowmeter. Steam having a pressure of 10 psig was also introduced to the reactor from the reactor wall side at a position below and near to the inlet point of $UF_6$. The flow rate of steam was regulated with a needle type metering valve. The whole piping system, as well as the tube reactor body, was heated with heating mantles to maintain a constant temperature of 125° C. The steam entering the reactor was thus super-heated and became completely dry. The flow rate of $UF_6$ vapor was 300 g/hr and steam was 60 g/hr. The $UO_2F_2$ powder formed in the reactor was finely divided and settled at the bottom of the reactor. Hydrogen fluoride gas produced in the reaction was filtered with a sintered-metal (Inconel 600) filter assembly and was sent to an alkali scrubbing system. After 5 hours, feeds of $UF_6$ and steam were ended. The feed line of $UF_6$ and the reactor were purged with nitrogen gas, and the $UO_2F_2$ powder produced was discharged to a container.

The foregoing $UO_2F_2$ powder was dissolved in deionized water to give a solution containing 1138 g/l of uranium with a density of 2.26 g/ml. Four liters of the solution was put in an Inconel pot, which was then pressurized to 75 psig with nitrogen gas. The $UO_2F_2$ solution coming from the pot through a bottom tube was atomized to form very small liquid droplets with an impingement type nozzle at the top of a spray column. The column had been prepurged with ammonia gas before use. An excess amount of ammonia gas was supplied continuously from the bottom of the column simultaneously. The liquid $UO_2F_2$ droplets were converted to ADU particles having a brown yellow color as soon as it contacted with ammonia gas. The excess ammonia gas and the water vapor leaving the column through a top exit pipe were sent to a water scrubber. The $UO_2F_2$ solution was used up completely in 4 minutes, then, the supply of ammonia gas was stopped immediately, and the column was purged with nitrogen gas. The product collected in a bottom tray in the column were wet but loosely divided granules, which, identified with x-ray diffractometry, were found to contain essentially ADU, AUF, and ammonium fluoride. No liquid filtrate was generated and no filtration operation was involved in the operation.

A sample weighted 169.5 g taken from the foregoing ADU product, having a moisture content of 25.6 wt % and an uranium content of 68.34 wt % (dry basis), was put in an Inconel tray with a bed depth of 1 cm. The tray was loaded inside a retort in an electrically heated furnace. The ADU mixture was converted to $UO_2$ with the following steps: (1) The bed temperature of ADU was increased from room temperature to 600° C. in 145 minutes; a nitrogen gas with a flow rate of 30 SCFH was introduced from the beginning of heating. (2) A steam with a mass flow rate of 12.79 g/min and a hydrogen gas with a volume flow rate of 30 SCFH were introduced immediately as temperature reached 600° C.; then, the bed temperature was kept isothermally for 90 minutes, and was then decreased to 540° C. in 40 minutes; the supply of the hydrogen gas was ended at this temperature. (3) The bed was cooled to 50° C., and the steam supply was ended at the moment when the temperature was lowered to 200° C. (4) Kept the temperature isothermally at 50° C., and a nitrogen gas containing 10% air was introduced for 60 minutes to stabilize the $UO_2$ powder. Then, the furnace was shut down and the product was cooled to room temperature and discharged.

The $UO_2$ powder thus obtained was 97.5 g, which gives a recovering rate of 99.7%. The powder was found to have a good flowability, a fluorine content 32 ppm, an O/U ratio 2.034, a bulk density 2.15 g/ml, and a specific surface area 2.2 m$^2$/g.

EXAMPLE 2

The procedure of example 1 was repeated except that the concentration of uranium in the $UO_2F_2$ solution for preparing ADU was 500 g/l. The ammoniation product thus prepared was found to contain essentially ADU, ammonium fluoride, and a small amount of AUF. The $UO_2$ powder thus obtained has a fluorine content 22 ppm, an O/U ratio 2.041, a bulk density 1.71 g/ml, and a specific surface area 2.2 m$^2$/g.

EXAMPLE 3

The procedure of example 1 was repeated with the exceptions that: (1) uranium concentration in the $UO_2F_2$ solution for preparing ADU was 634 g/l; (2) the drying and the calcining of the ADU product were carried out with a temperature profile of increasing from room temperature to 550° C. in 130 minutes, and then kept the temperature isothermally at 550° C. for 60 minutes; (3) the reduction was carried out at a constant temperature of 550° C. for 60 minutes and, then, by decreasing the temperature from 550° C. to 500° C. in 30 minutes. The $UO_2$ powder thereof made has a fluorine content 45 ppm, an O/U ratio 2.048, a bulk density 2.22 g/cm$^3$, and a specific surface area 3.7 m$^2$/g.

EXAMPLE 4

An uranyl nitrate solution containing 502 g/l uranium was prepared by dissolving pure uranyl nitrate in a de-ionized water. The procedures of example 1 were repeated to convert the uranyl nitrate to $UO_2$ powder with the exceptions that: (1) the impingement nozzle was replaced by an ultra sonic atomizer in atomizing the solution; (2) the drying and the calcining of ADU were carried out with a temperature profile of increasing from room temperature to 500° C. in 85 minutes, and then kept this temperature at constant for 60 minutes; (3) the reduction was carried out with a temperature profile of increasing from 500° C. to 600° C. in 35 minutes, then kept the temperature isothermally for 100 minutes, and finally decreased the temperature from 600° C. to 500° C. in 50 minutes. The $UO_2$ powder obtained is free flowing, it was found to have an O/U ratio 2.106, a specific surface area 4.9 m$^2$/g, and a bulk density 0.4 g/ml.

EXAMPLE 5

A solution containing 502 g/l uranium and 30.12 g/l gadolinium was prepared by dissolving uranyl nitrate in a de-ionized water and dissolving gadolinium oxide in a nitric acid solution, and then mixed up. Following the procedures of example 4, the mixed solution of uranyl nitrate and gadolinium nitrate was converted to a gadolinium-uranium oxide with the exceptions that: (1) the drying-calcining operation was done with a temperature profile of increasing from room temperature to 500° C. in 100 minutes, and then kept the temperature at constant for 60 minutes; (2) the reduction operation was done with a temperature profile of increasing the temperature from 500° C. to 650° C. in 45 minutes, then kept this temperature at constant for 100 minutes, and decreased to 500° C. in 80 minutes; (3) the cooling profile comprised decreasing the temperature from 500° C. to 60° C. in 195 minutes; and (4) the stabilization of $UO_2$ powder was carried out at 60° C. The U-Gd oxide thus obtained was found to have an oxygen/metal molar ratio 2.187, a bulk density 0.32, and a specific surface area 10.5 m$^2$/g.

What is claimed is:

1. A process for the conversion of $UF_6$ to $UO_2$ comprising the steps of
    (a) pyrohydrolyzing gaseous $UF_6$ with steam in a reactor to prepare $UO_2F_2$ powder;
    (b) dissolving the $UO_2F_2$ powder in water to form an aqueous $UO_2F_2$ solution;
    (c) atomizing the aqueous $UO_2F_2$ solution and contacting the atomized solution with an ammonia-containing gas stream to produce wet ADU particles;
    (d) drying and calcining the ADU particles to obtain a calcined powder; and
    (e) reducing the calcined powder to $UO_2$ with a hydrogen gas or a hydrogen-steam mixture.

2. A process for the conversion of a uranyl compound to $UO_2$ comprising the steps of
    (a) dissolving the uranyl compound in water to obtain an aqueous solution of the uranyl compound;
    (b) atomizing the aqueous solution and contacting the atomized solution with an ammonia-containing gas stream to produce wet ADU particles;
    (c) drying and calcining the ADU particles to obtain a calcined powder; and
    (d) reducing the calcined powder to $UO_2$ with a hydrogen gas or a hydrogen-steam mixture.

3. The process according to claim 2, in which gadolinium nitrate is also dissolved in the aqueous solution of the uranyl compound obtained in step (a) to produce a $Gd_2O_3$-$UO_2$ powder in step (d).

4. The process according to claim 1, in which the concentration of $UO_2F_2$ in the aqueous $UO_2F_2$ solution used for atomizing in step (c) is below the saturation concentration of $UO_2F_2$ in the solution.

5. The process according to claim 1, in which the ammonia-containing gas used for the preparation of ADU in step (c) is a single component gas, or a gas mixture containing ammonia gas.

6. The process according to claim 1, in which the temperature used for drying and calcining in step (d) is below 750° C.

7. The process according to claim 1, in which the reduction temperature used in step (e) is below 850° C.

8. The process according to claim 4, in which the temperature of the aqueous $UO_2F_2$ solution is below its boiling point.

9. The process according to claim 5, in which the operation temperature used in the preparation of ADU is below 200° C.

10. The process according to claim 9, in which the pressure of the ammonia-containing gas stream used is below 10 atm.

11. The process according to claim 2, in which the concentration of the uranyl compound in the aqueous solution used for atomizing in step (b) is below the saturation concentration of the uranyl compound in the solution.

12. The process according to claim 2, in which ammonia-containing gas used for the preparation of ADU in step (b) is a single componet gas, or a gas mixture containing ammonia gas.

13. The process according to claim 2, in which the temperature used for drying and calcining in step (c) is below 750° C.

14. The process according to claim 2, in which the reduction temperature used in step (d) is below 850° C.

15. The process according to claim 11, in which the temperature of the aqueous solution of the uranyl compound is below its boiling point.

16. The process according to claim 12, in which the temperature used in the preparation of ADU is below 200° C.

17. The process according to claim 16, in which the pressure of the ammonia-containing gas stream used is below 10 atm.

18. The process according to claim 3, in which the weight ratio of uranium to the total of uranium and gadolinium in the $Gd_2O_3$-$UO_2$ powder is larger than 0.7.

19. The process according to claim 18, in which the concentration of the uranyl compound and gadolinium in the aqueous solution used for atomizing in step (b) is below the saturation concentration of the uranyl compound and gadolinium in the solution.

20. The process according to claim 3, in which ammonia-containing gas used for ammoniation in step (b) is a single component gas, or a gas mixture containing ammonia gas.

21. The process according to claim 3, in which the temperature used for drying and calcining in step (c) is below 750° C.

22. The process according to claim 3, in which the reduction temperature used in step (d) is below 900° C.

23. The process according to claim 19, in which the temperature of the aqueous solution used for ammoniation is below its boiling point.

24. The process according to claim 20, in which the operation temperature of ammoniation is below 200° C.

25. The process according to claim 20, in which the pressure of the ammonia-containing gas stream used is below 10 atm.

* * * * *